US012567674B2

(12) United States Patent
Jo

(10) Patent No.: US 12,567,674 B2
(45) Date of Patent: Mar. 3, 2026

(54) MULTI-LAYER COUPLING-CONTROLLED ULTRA COMPACT ANTENNA SYSTEM

(71) Applicant: SkyMirr, Inc., Melbourne, FL (US)

(72) Inventor: Youngmin Jo, Melbourne, FL (US)

(73) Assignee: SkyMirr, Inc., Melbourne, FL (US)

( * ) Notice: Subject to any disclaimer, the term of this patent is extended or adjusted under 35 U.S.C. 154(b) by 125 days.

(21) Appl. No.: 18/747,795

(22) Filed: Jun. 19, 2024

(65) Prior Publication Data

US 2025/0055198 A1 Feb. 13, 2025

Related U.S. Application Data

(60) Provisional application No. 63/552,755, filed on Feb. 13, 2024, provisional application No. 63/552,769, filed on Feb. 13, 2024, provisional application No. 63/531,547, filed on Aug. 8, 2023.

(51) Int. Cl.

| | |
|---|---|
| ***H01Q 13/10*** | (2006.01) |
| ***H01Q 1/36*** | (2006.01) |
| ***H01Q 1/38*** | (2006.01) |
| *H01Q 7/06* | (2006.01) |
| *H01Q 11/08* | (2006.01) |

(52) U.S. Cl.

CPC ............... *H01Q 13/10* (2013.01); *H01Q 1/36* (2013.01); *H01Q 1/38* (2013.01); *H01Q 7/06* (2013.01); *H01Q 11/08* (2013.01)

(58) Field of Classification Search

CPC ........... H01Q 13/10; H01Q 1/36; H01Q 1/38; H01Q 7/06; H01Q 11/08; H01Q 1/362; H01Q 21/067

See application file for complete search history.

(56) References Cited

U.S. PATENT DOCUMENTS

| | | | | |
|---|---|---|---|---|
| 5,986,619 | A | 11/1999 | Grybos et al. | |
| 10,608,344 | B2 * | 3/2020 | Paulotto | H01Q 3/2652 |
| 11,456,537 | B1 | 9/2022 | Graf et al. | |
| 2019/0334230 | A1 | 10/2019 | Jesme et al. | |
| 2022/0115775 | A1 | 4/2022 | Rossman et al. | |
| 2022/0407233 | A1 * | 12/2022 | Woo | H04B 7/0617 |

FOREIGN PATENT DOCUMENTS

| | | | | |
|---|---|---|---|---|
| KR | 102499766 B1 * | 2/2023 | | H04B 1/0458 |

* cited by examiner

*Primary Examiner* — Seung H Lee

(74) *Attorney, Agent, or Firm* — John L. DeAngelis; Wolter Van Dyke Davis, PLLC

(57) ABSTRACT

A multi-layer coupling-controlled antenna. A first and second spaced-apart radiating elements define a gap therebetween and each is responsive to a source signal. A third conductive element is disposed below and spaced apart from the first and second radiating elements and located to bridge the gap. An upper conductive element is disposed above and spaced apart from the first and second radiating elements. The upper conductive element comprises a single element or a plurality of spaced-apart conductive elements. A lower conductive element is disposed below and spaced apart from the third conductive element.

13 Claims, 7 Drawing Sheets

MULTI-LAYER COUPLING-CONTROLLED ULTRA COMPACT ANTENNA SYSTEM

CROSS REFERENCE TO RELATED APPLICATIONS

The present invention claims priority under 35 U.S.C. 119(e) to the provisional patent application filed on Aug. 8, 2023 and assigned application No. 63/531,547, the provisional patent application filed on Feb. 13, 2024 and assigned application No. 63/552,755, and the provisional patent application filed on Feb. 13, 2024 and assigned application No. 63/552,769. These provisional patent applications are incorporated in their entirety herein.

FIELD OF THE INVENTION

The present invention relates to ultra-compact multi-layer antenna systems and helical antenna systems with improved antenna performance, especially as related to recognition distance.

BACKGROUND OF THE INVENTION

Printed Circuit Board (PCB) antennas are popular due to their small size, affordability, and ease of integration into various electronic devices. They utilize the conductive traces and components on the PCB substrate. PCB antennas offer portability by occupying minimal space on the PCB, making them suitable for compact devices. They eliminate the need for external antennas, simplifying the device's design. Another advantage is their low cost, as they can be directly fabricated onto the PCB without the use of additional materials. These important features make PCB antennas suitable for mass production.

RFID (Radio Frequency Identification) technology is employed to wirelessly recognize objects, such as the identification and extraction of information from cards, books, and merchandise. RFID technology is also used in merchandise distribution logistics. Furthermore, RFID concepts are expected to be more routinely applied to the diagnosis and management of healthcare issues in both humans and animals.

In the past, RFID technology has used a frequency of 135 kHz. But this frequency has known shortcomings related to recognition distance and a low data transmission rate. Therefore, current RFID technology is moving to a higher frequency of 13.56 MHz.

The use of an RFID tag antenna for biometric management is referred to as a biochip antenna. The surface area of a biochip is about the size of a fingernail. Like a computer chip that can perform millions of operations per second, a biochip can perform thousands of biological reactions in a few seconds. For example, the biochip can decode thousands of genes within several seconds. Biochips are also useful in identifying individual persons.

Clearly, a conventional dipole or monopole antenna cannot be used as a biochip antenna. These antennas require a length of a half wavelength or a quarter wavelength, which is far too long for any biochip application. New antenna designs must be developed for biochip applications. While certain conventional coil antennas have been used as biochip antennas, they do not perform well as the recognition distance, i.e., the distance between the receiving and transmitting devices for accurate data transmission, is still very short. The antenna embodiments described herein operate effectively and accurately transfer data over a longer recognition distance.

DETAILED DESCRIPTION OF THE INVENTION

Implementation of the technology of the present invention can improve antenna performance significantly by improving the mutual coupling/mutual radiation between the antenna components of the communicating devices. Thus, the various disclosed antennas may be referred to as multi-layer coupling controlled ultra-compact antennas (MulCAT antennas).

One inventive antenna structure comprises a ferrite core with two or more coupled wires wrapped around the core in a first layer, and two or more coupled wires wrapped around the core in a second layer. More layers can be added to improve performance, but a biochip antenna with additional layers may create size and space problems as well as manufacturability issues.

In one embodiment, the present invention relates to an antenna system comprising multiple helical-shaped elements that are positively mutually coupled according to the physical placement of the elements and current direction through the antenna elements.

Helix shaped elements are selected in one embodiment to minimize energy losses, thereby maximizing antenna performance parameters, such as efficiency and gain.

Positive coupling between elements is realized by alignment of the elements to generate electromagnetic fields that positively combine to maximize antenna performance and thereby performance of the device in which the antenna is embedded.

The direction of the generated fields is determined by the direction of the surface currents and the electric distance (multiplied by the wavelength of the transmitted or received signal) from the current sources. By aligning the field from each element in the same direction the fields are additive, thereby increasing the radiated energy.

The various embodiments of the invention can be used for micro-sized tiny antenna elements for near-range data transmission in bio chip applications as described above, as a compact antenna array for energy monitoring applications (for example, in an advanced energy metering application to remotely read electric utility meters), and in large antenna array systems for long range satellite or terrestrial communications.

Figure 1:
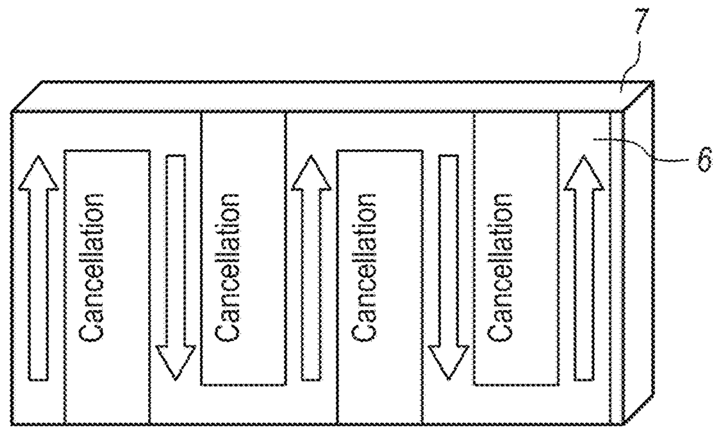
FIG. 1 (Prior Art)
FIGS. 1, 2, and 3 each illustrate a prior art antenna comprising several conductive traces disposed on one or several surfaces of a printed circuit board.

FIG. 1 depicts a conventional prior art printed circuit board (PCB) meanderline antenna element 6 mounted on a printed circuit board 7. As illustrated by the arrowheads, the current direction in each antenna leg is opposite to the current direction in an adjacent antenna leg; therefore, the energy or fields generated by the opposing currents cancel.

Figure 2:
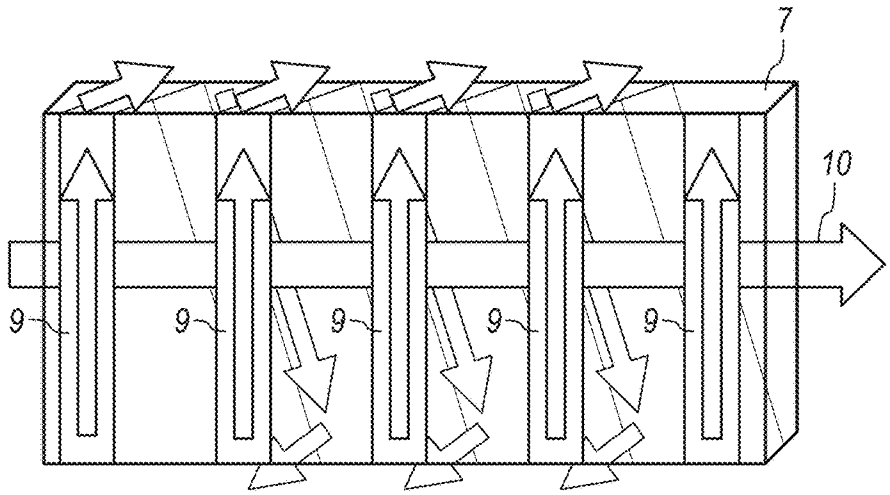
FIG. 2 (Prior Art)
Figure 3:
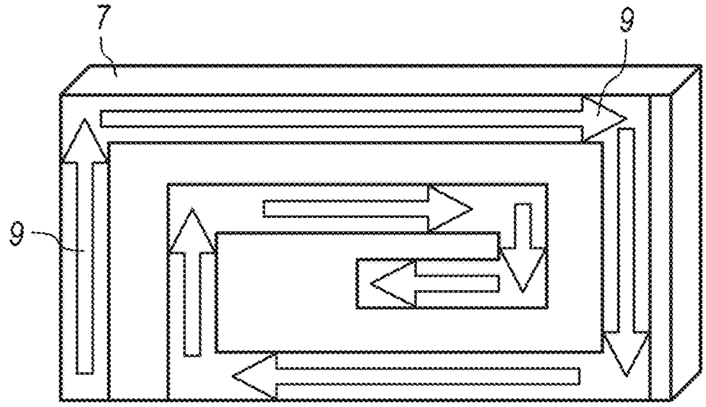
FIG. 3 (Prior Art)

In the prior art antenna structures of FIGS. 2 and 3 the currents flow in the same direction in each adjacent antenna element (as indicated by arrowheads 9 in each Figure) and the energy fields generated by the currents are additive. In FIG. 2, note that the arrowheads 9, representing current flow, extend along the top and rear surfaces of the PCB 7 and adjacent currents flow in the same direction. An arrowhead 10 in FIG. 2 illustrates the direction of the generated field.

Figure 4A:
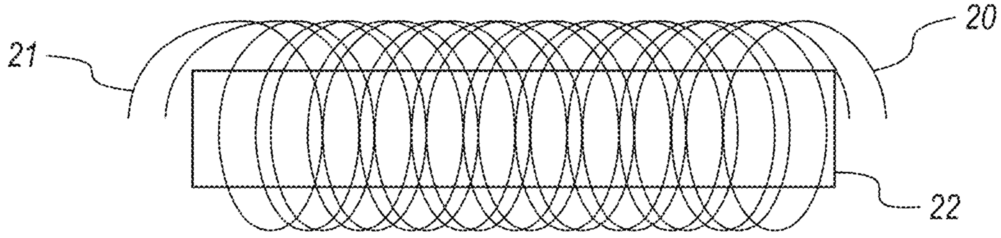
FIG. 4A illustrates two concentrically wound helical antennas and FIG. 4B illustrates the vector fields produced by the individual antennas and the composite field.
Figure 4B:
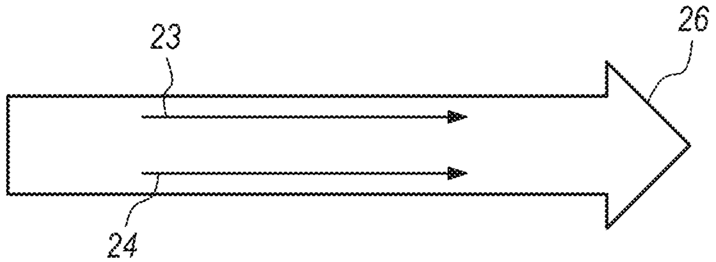

FIG. 4A illustrates two concentric helical antennas 20 and 21 designed for near field communications (NFC). In FIG. 4B arrowheads 23 and 24 depict the magnetic field generated by each helix. Since the two elements (operating as current sources) are co-located, the resulting fields extend in the same direction and are therefore additive, as indicated by a sum arrowhead 26. Summation of the two fields maximizes the magnetic field induced in a receiving or reading device.

In an embodiment comprising two helical windings and a ferrite core 22 extending through both windings, the size of the antenna is approximately is about 1 mm in diameter and about 8 mm long. Generally, the ferrite core embodiment offers improved performance.

The operating frequency for either embodiment includes the conventional NFC frequency of 13.56 Mhz. The VSWR (voltage standing wave ratio) at 13.56 MHz is an advantageously low value.

The antennas may be constructed as a surface mount device for direct attachment (soldering) to a printed circuit board.

In operation, the same signal is input to both helixes and both helixes have the same diameter.

Typical uses for the antenna include: wearable devices, IoT devices, smart watches and earphones, payment terminals, and biomedical devices such as hearing aids and human and animal implants.

Figure 5A:
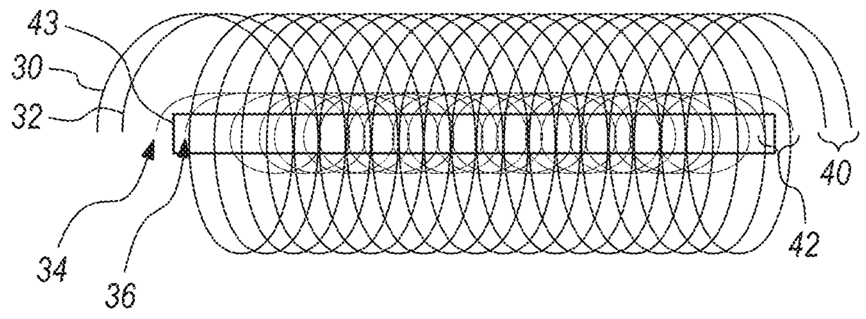
FIG. 5A illustrates four concentrically wound helical antennas and FIG. 5B illustrates the vector fields produced by each antenna and the composite field.

FIG. 5A illustrates four concentric helical windings (also referred to as antennas) 30, 32, 34, and 36, with two helical antennas formed in each one of an outer layer and an inner layer. Interleaved and concentric helical antennas 30 and 32 are formed in the outer layer and present the same diameter. Similarly, interleaved and concentric helical antennas 34 and 36 are formed in the inner layer and present the same diameter.

Figure 5B:
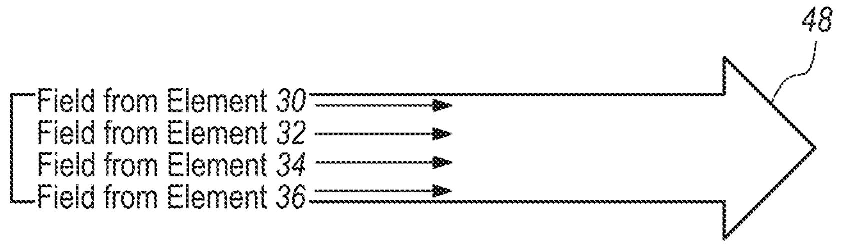

Assuming current flow from left to right in FIG. 5A, FIG. 5B illustrates the additive fields from each of the four windings. The composite field is represented by an arrowhead 48.

As in the two-helix design of FIG. 4A, a ferrite core 43 can be disposed within the four helical windings of FIG. 5A. Also, the windings can be configured as a surface mount device for attachment (by soldering) to a printed circuit board. Operation at the NFC frequency of 13.56 MHz is preferred. Applications for the FIG. 5A embodiment are like those identified for the FIG. 4A embodiment.

In one embodiment in which the core 43 comprises a rectangular core the configuration of FIG. 5A is about 1.3×1.3×8.0 mm. The identification recognition distance is about 16.8 mm and the data recognition distance is about 23.3 mm.

Figure 6:
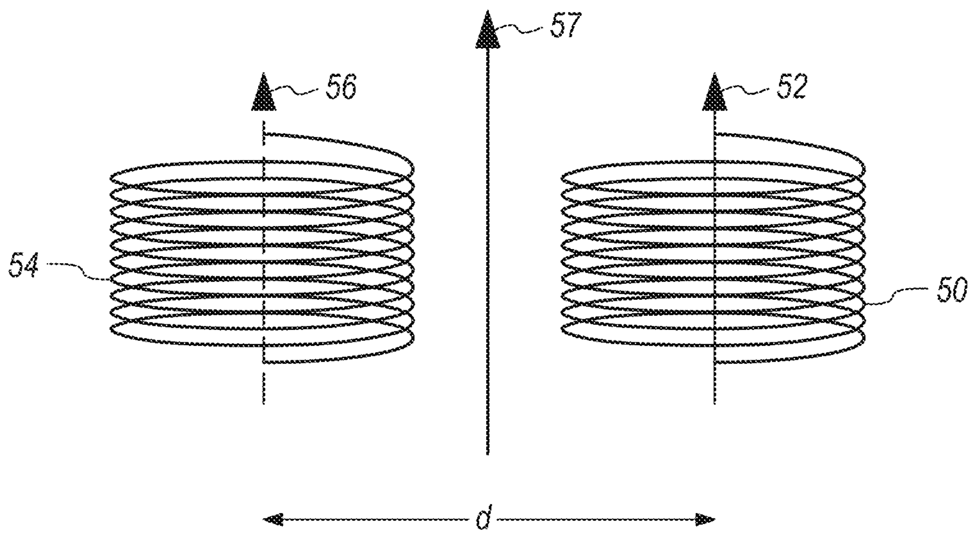
FIG. 6 illustrates two spaced-apart helical antennas.

FIG. 6 illustrates a coil 50 (operating as a current source) connected to a source (not shown) and an arrowhead 52 indicating the direction of the resulting magnetic flux produced by the coil 50. A proximate coil 54 is not connected to a source, but instead derives flux from the coil 50 by induction. A broken arrow 56 indicates the direction of the field generated by the coil 54. Note that field generated by each coil 50 and 54 is in the same direction and therefore additive. An arrowhead 57 represents the vector addition of the fields represented by the arrowheads 52 and 56.

A distance "d" between the coils 50 and 54 can be varied to change the current induced in the coil 54 by the magnetic flux generated by the coil 50.

In one embodiment the antenna, comprising the two coils illustrated in FIG. 6, is about 38 mm×18.6 mm×1.6 mm with operation within the frequency band of 824-894 MHz. The radiation pattern within that frequency band is the familiar donut shape with the donut hole along the z-axis.

Figure 13:
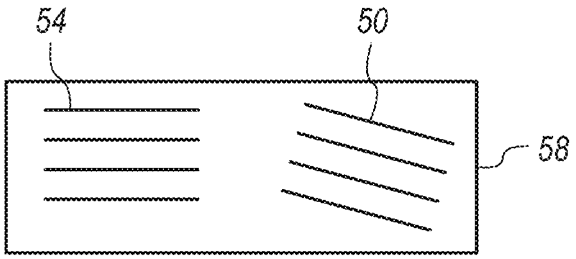
FIG. 13 illustrates an embodiment of the FIG. 6 helical antennas embedded in a printed circuit board.

In a preferred embodiment the coils can be formed within a printed circuit board for easy placement within a communications device. See FIG. 13. A printed circuit board 58 supports the windings 50 and 54, which in this embodiment each comprise conductive traces on the printed circuit board. The FIG. 13 view shows only those segments of the windings on a first surface of the board; the windings also extend through the board and onto the opposing hidden (from view in FIG. 13) surface of the board.

The FIG. 6 omnidirectional antenna is suitable for use in LTE Cat-M1 equipment. LTE Cat-M1 is a low-power wide-area network designed specifically for use with trackers and meters that transmit small to medium amounts of data over a wide range. For example, the antenna ca be used in the advanced metering infrastructure system (AMI), an integrated, fixed-network system that enables two-way communications between utilities and their customers. The AMI system collects, stores, analyzes, and communicates the energy usage data to the utilities, providing utility companies with the ability to monitor electricity, gas, and water usage in real time.

The antenna system of FIG. 6 is significantly different from a transformer, which typically comprises a primary and second winding with a common iron core. In the FIG. 6 system a magnetic field of the first coil/radiator 50 excites the second coil/radiator 54 so that the second coil/radiator 54 acts another current source, that is, in addition to the current source of the first coil/radiator. The radiated fields are added since the magnetic currents in those coils/radiators are in the same direction. This maximizes the radiation efficiency and gain of the antenna system.

The current direction in the second coil/radiator 54 depends on the distance between the two radiators. Also, the distance and the shape of the coils/radiators can be adjusted, as desired, to make the second coil/radiator generate a magnetic current with the same direction as the magnetic current in the first coil/radiator. Unlike a transformer, there is no effective energy transfer between the two coils/radiators of FIG. 6.

Figure 7A:
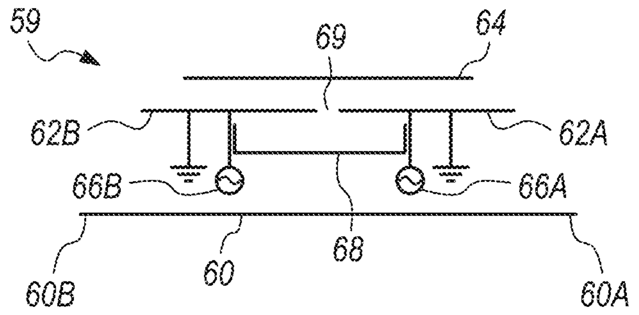
FIGS. 7A and 7B illustrate multiple antenna elements disposed in layers.

FIG. 7A illustrates an antenna 59 comprising multiple conductive surfaces disposed within different layers of a printed circuit board (PCB).

Radiating structures 62A and 62B are driven by signals from respective sources 66A and 66B. Preferably, these radiating structures are formed in the same layer of the PCB.

Element 64 operates as a lens by focusing the fields or beams generated by the radiating structures 62A and 62B, thereby improving gain of the antenna 59.

A bottom conductor 60 operates as a reflector (reflecting the fields generated by the radiating structures 62A and 62B), thereby also improving the overall gain of the antenna 59. Specifically, electromagnetic waves produced by the radiating structures 62A and 62B are deflected at edges 60A and 60B of the bottom conductor 60. In a sense, these edges act as virtual current sources.

A U-shaped conductive structure 68 forms another layer and is floating, i.e., not physically connected to any other structures in FIG. 7A. The structure 68 joins the fields generated by the two radiating structures 62A and 62B and reduces interference created by these two closely-spaced radiating structures.

The operating frequency for the assembly of FIG. 7A is determined based on the dimensions of the radiators 62A and 62B and a gap 69.

As explained above, each of the structures 60, 62A, 62B and 64 generates an electromagnetic field, either directly from current supplied by the sources 66A and 66B or by reflection or focusing action on these generated fields.

Figure 7B:
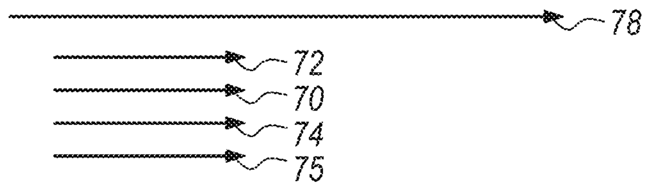

Thus, the structures 60 and 64 are excited by energy from the radiating structures 62A and 62B and each of these four structures generates a field. The fields are represented in FIG. 7B by arrowheads 70, 72, 74, and 75. The four fields are in the same direction and thus additive as indicated by a combined field arrowhead 78.

Figure 8:
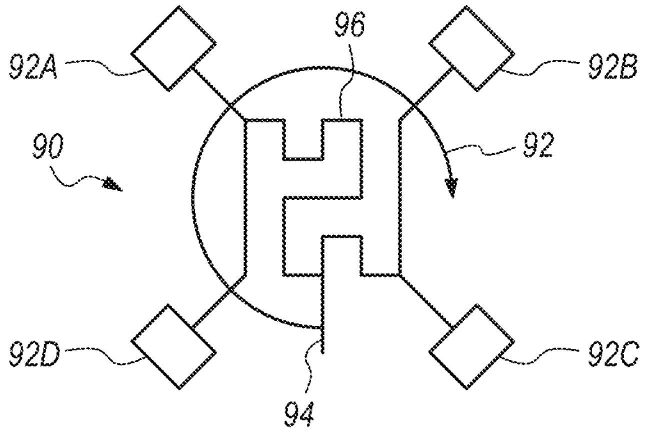
FIGS. 8, 9, and 10 illustrate various embodiments of antennas for producing a rotating radiation field.

FIG. 8 depicts a PCB-based antenna 90, comprising four radiating structures 92A, 92B, 92C, and 92D for generating a rotating radiating field as depicted by an arrowhead 92. The antenna 90 is fed at an input port 94. A PCB trace 96 distributes the input signal to each radiating structure to generate the rotating field. A length of the trace 96 and a position of each radiating structure 92A, 92B, 92C, and 92D along the length of the trace create a 90 degrees signal phase shift (quadrature signal phasing) between the signal radiated by each of the four elements.

Figure 9:
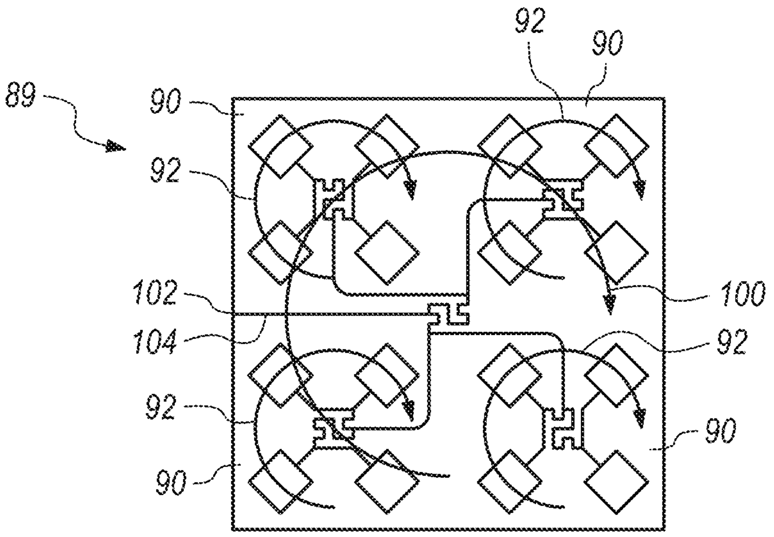

FIG. 9 depicts a block level structure 89 of four elements 90 (from FIG. 8) with the same feed structure as the element-level feed structure in FIG. 8. Each of the elements 90 generates a circularly polarized signal (that is, a rotating field as indicted by arrowhead 92 for the four elements 90 in FIG. 8). The field rotates based on the feeding structure for each element. An arrowhead 100 indicates the sum of the four fields. The block level structure is fed at an input terminal 102 and the signal fed to each of the four elements 90 via a trace network 104.

Figure 10:
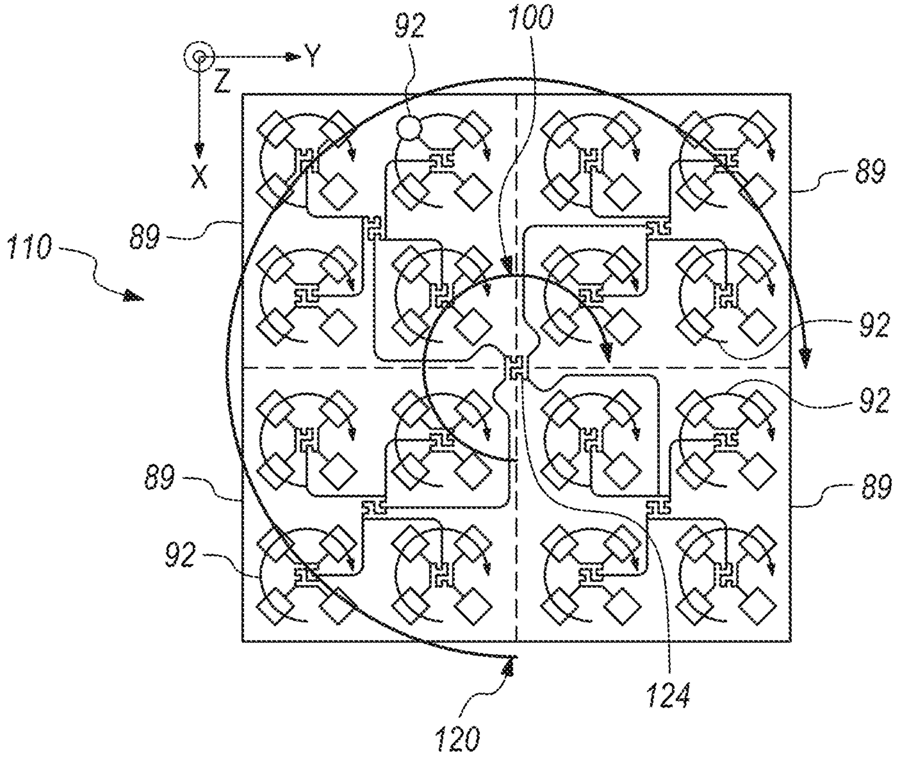

FIG. 10 depicts a system 110 comprising four blocks (each similar to the block 89 of FIG. 9) with each block comprising four antenna radiating structures as set forth in FIG. 8. As a result, the system generates a very strong rotating field as depicted by an arrowhead 120 with almost perfect circular polarization. The rotating field of the system 110 comprises an element-level rotating field based on the element feeding structure, as indicated by the arrowheads 92; a block-level rotating field based on the block feeding structure, as indicated by the arrowhead 100; a system-level rotating field 120 based on the system-level feeding structure (fed from an input port 124). Thus, the combined field, indicated by the arrowhead 120, results in a strong circular polarization (that is, a rotating radiated field). Since all the fields are rotating in the same direction, the loss is minimized therefore, the bandwidth and gain is significantly improved compared to a conventional linear array system.

Figure 11A:
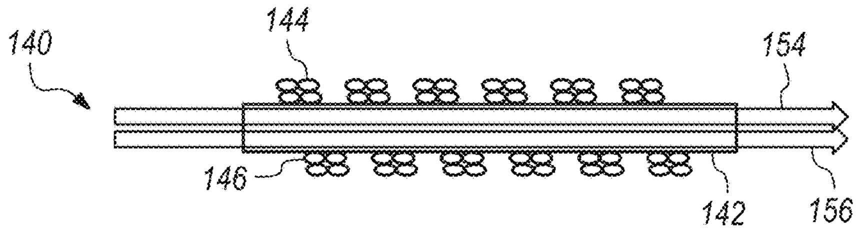
FIGS. 11A and 11B illustrate another helical antenna structure.
Figure 11B:
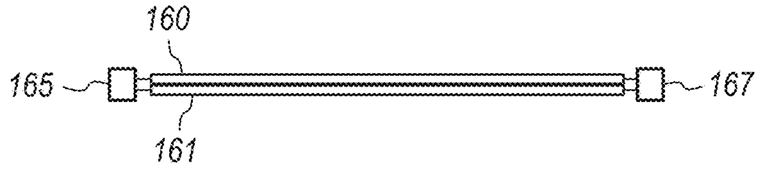

Another embodiment of a helix-winding based compact antenna 140 is illustrated in FIGS. 11A and 11B.

In FIG. 11A, the two wires in each layer 144 (outer) and 146 (inner) are physically coupled/shorted and wrapped around a ferrite core 142 to increase the magnetic flux, while minimizing the reluctance. The wires in each of the layers 144 and 146 are coupled to generate magnetic flux in the same direction to thereby generate a stronger electromagnetic field. Although two coupled wires are shown in each of layers 144 and 146 of FIG. 11A, any number of additional wires can be added to each layer to increase the magnetic flux and thus the antenna performance, while maintaining a low inductance. Also, the wires in each layer are disposed in a very close relationship and are very tightly wrapped around the ferrite core to reduce the size of the antenna structure. The wires of each layer are covered or coated with an insulating material to avoid short circuiting the windings.

The operational characteristics of the antenna 140 are similar to operation of the antenna of FIG. 4A. Both the embodiments of FIGS. 4A and 11A provide a better transmission range, with higher data rates over a longer distance than prior art antennas.

FIG. 11B shows one technique for connecting two wires 160 and 161 (from a single layer) together using a soldering pad 165 and 167 at each end of the two wires. The two connected wires in either layer can connected to a source (or to an RF circuit acting as a source) or to ground.

One embodiment of the FIG. 11A antenna is about 1 mm×1 mm×8 mm and operates at a frequency of 14 MHz. The multiple coupled turns generate an electromagnetic field. This antenna provides a wider bandwidth at 14 MHz than prior art antennas. The recognition distance is improved from about 12 mm for a single wire coil antenna to about 16 mm for an embodiment with two wires in the first layer. Performance is further improved with two wires in each layer (as in FIG. 11A.

The magnetic flux of the antenna 140 is given by $$\Phi_t = \frac{NI}{\mathfrak{R}_t}[\mathrm{Wb}]$$

where N is the number of turns, I is the input current, $R_t$ is the reluctance of the antenna, and the result is given in Webers.

In the antenna 140 of FIG. 11A, the two-wire coupled antenna has the same inductance value as a single wire antenna, since the two coupled wires are both connected to the same source and therefore drive the same current as a single-wire antenna. Also, the reluctance value is the same as for a single wire antenna. But the two coupled wires can be considered extra turns, therefore, according to the equation above, the magnetic flux is increased.

The layers 144 and 146 can generate more magnetic flux and the magnetic flux derived from each layer can generate a magnetic field. Negative coupling between the layers 144 and 146 can be reduced or removed by wrapping the layers in the same direction. The magnetic field generated by the two layers are the same direction, creating a greater total magnetic field, as indicated by the arrowheads 154 and 156.

The antenna 140 provides a greater bandwidth than prior art antennas at an operating frequency of about 14 MHz.

Also, the recognition distance is improved from about 12 mm for a single-wire coil antenna, to about 16 mm for a dual-wire coil antenna.

Figure 12:
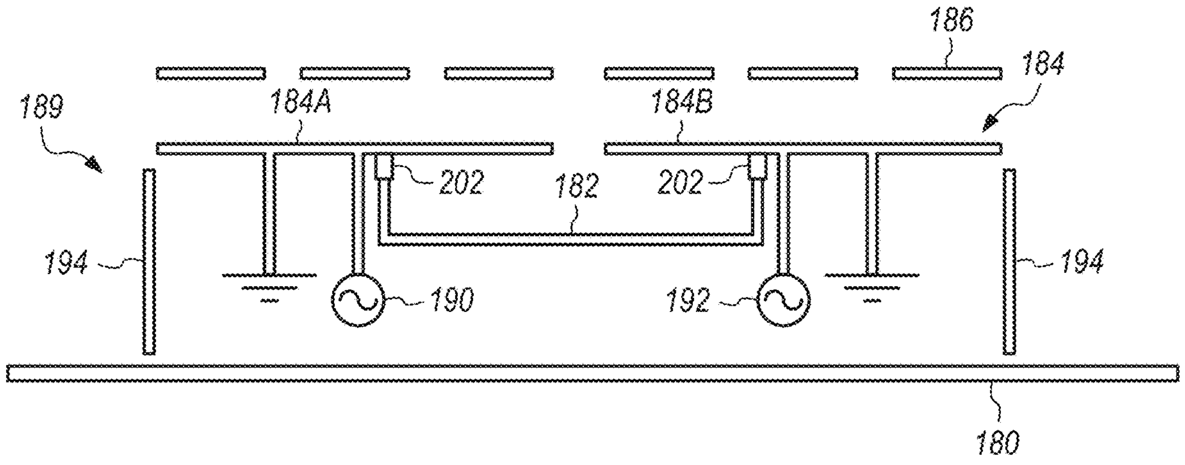
FIG. 12 illustrates an embodiment comprising multiple antenna elements disposed in layers.

Another MulCAT design is illustrated by antenna 179 of FIG. 12, comprising four layers 180, 182, 184A, 184B, and 186 that are not nor conductively nor physically connected. But there is electrical coupling between the elements in each layer. The extent of this coupling depends on the proximity of the layers; coupling between distant layers is not significant. For example, coupling between layers 180 and 186 in FIG. 12 is not significant. By properly controlling the coupling, the antenna performance can be significantly improved. Also, the physical structure of each layer and the gap distance between the layers influence the antenna performance.

Note that FIG. 12 is a side view of the antenna 179; each of the illustrated layers has both a length (as shown in FIG. 12) and a width (extending into the plane of the figure). Thus, each of the antenna elements comprises a planar sheet of conductive material. As to layer 182, base of the U-shape is planar.

In FIG. 12, layer 184 is the driven layer as fed from ports 190 and 192 when operating in the transmitting mode. Other layers can serve as the driven layer in other applications and embodiments.

Figure 14:
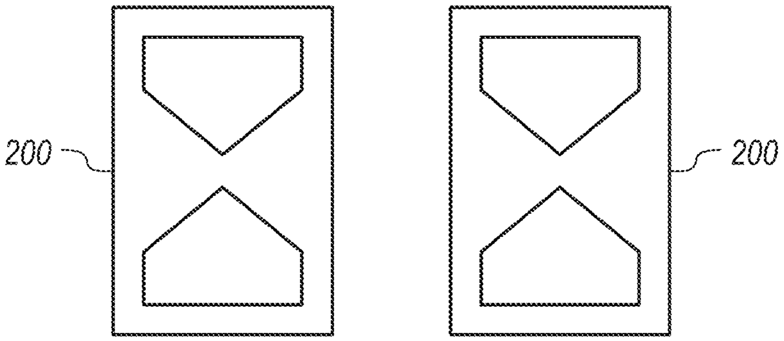
FIG. 14 illustrates a slot antenna layer for use as the upper layer in the embodiments of FIGS. 7A and 12.

In one embodiment, the structure in the driven layers 184A and 184B comprises a slot antenna. See the slot antennas 200 in FIG. 14. The slot antennas 200 can also be used in lieu of the radiating structures 62A and 62B of FIG. 7A. However, other antenna structures can be used in lieu of the slot antenna and a slot antenna can be used in any of the other layers.

Generally, low band resonance is improved with the antenna 179 based on the coupling between layers 180 and 184. Extension elements 194 (see FIG. 12) can be added to layer 180 to increase the coupling between layers 180 and 184. Recognizing that layer 180 is planar, the extension elements are disposed along all four edges of the layer 180.

In one embodiment, due to interference between the two radiators 184A and 184B overall performance is unfortunately reduced from an embodiment with only a single layer, such as the embodiment of FIG. 7A. But two radiators in layer 184 provides improved MIMO performance.

The one or two radiators in layer 184 generate electromagnetic fields.

Note that the layer 180 is not a patch antenna and is not connected to a source or to ground.

The electromagnetic field generated by the layer 184 (radiators 184A and 184B) drives surface currents in layer 180, which therefore acts as another current source. The coupling between layer 180 and layer 184 determines the radiation pattern and gain of the antenna.

In one embodiment, the radiating structures 184A and 184B and layer 182 are not physically connected. The layer 182 blocks direct energy transfer between the port 190 and the port 192. However, the coupling between the feed lines associated with ports 190 and 192 and layer 182, due to the short distance between these elements, helps positive energy stream between the port 190 radiator 184A and the port 192 radiator 184B. Therefore, this configuration improves the radiation characteristics of the antenna, such as gain, while keeping the interference between the two ports 190 and 192 to a minimum. A coupling element can also be added to the layer 182 to reduce the interference between the. radiators 184A and 184B and thereby improve overall performance of the antenna.

The layer 186 comprises a plurality of individual conductive surfaces. The coupling between the layer 184 and the elements of layer 186 can improve both gain and directivity of the antenna.

The antenna 179 is designed to connect a home-based device to a base located at a significant distance from the home-based device. Therefore, a back lobe in the radiation pattern is not required. Instead, a high gain beam is pointed in the direction of the base station (or repeater) to successfully connect the home based to a network.

In one embodiment the layer 182 is conductively isolated from the radiating structures 184A and 184B. In another embodiment, layer 182 is conductively coupled to radiating structures 184A and 184B by a conductive element 202 disposed at both terminal ends of the layer 182.

Generally, the antenna 179, referred to as an MULCAT terrestrial communications antenna, includes a four-layer structure as illustrated in FIG. 12. The antenna 179 provides broadband coverage, high gain in all frequency bands, and high isolation between bands. The antenna 179 supports 2×2 MIMO operation.

The multilayer coupling controlled antenna 179 offers improved performance by controlling the mutual coupling between each of the antenna components or layers. The radiation pattern for the antenna 179 tends to be directional. The antenna is therefore ideal for use in undeveloped countries where there are few base stations in an area. Users in such countries therefore often have difficulty connecting their home-based device to the Internet through a wireless link simply because the base station is located at a considerable distance. The high gain offered by the antenna 179 can be steered to point the main antennae beam in the direction of the base station and thereby easily connect the home-based device to the base station.

The ramp up of 5G wireless service requires wide frequency bandwidth coverage and high-performance RF antenna solutions. But existing technology falls short due to limitations in broadband frequency coverage and limited gain.

As described in the context of the various MulCAT and helical antennas described herein, antenna performance can be significantly improved by controlling the mutual coupling between each antenna component. And these technologies can be used in a wide variety of applications that require large or small antenna/RF systems.

Generally, performance of the various antenna embodiments that comprise one or more radiating elements can be improved by controlling the mutual coupling between the antenna elements. Gain is typically improved more than twofold when compared with prior art antennas. Bandwidth is also increased (about doubled) so that a larger segment of the frequency spectrum is covered. Generally, the described novel antennas are also more efficient than antennas of the prior art, data rates are higher, and data error rates are lower.

What is claimed is:

1. An antenna comprising:

first and second spaced-apart radiating elements defining a gap therebetween, each of the first and second radiating elements responsive to a respective source;

a third conductive element disposed below and spaced apart from the first and second radiating elements so as to bridge the gap;

an upper conductive element disposed above and spaced apart from the first and second radiating elements;

a lower conductive element disposed below and spaced apart from the third conductive element.

2. The antenna of claim 1, wherein a shape of the third conductive element comprises an inverted U shape.

3. The antenna of claim 1, wherein a length of the lower conductive element is greater than a total length of the first and second radiating elements.

4. The antenna of claim 1, wherein a length of the upper conductive element is shorter than a total length of the first and second radiating elements.

5. The antenna of claim 1, wherein each one of the first and second radiating elements, and the third, upper, and lower conductive elements comprises a conductive sheet.

6. The antenna of claim 1, wherein an operating frequency of the antenna is determined by dimensions of the first and second radiating elements and the gap.

7. The antenna of claim 1, wherein electromagnetic fields are generated by the upper and lower conductive elements responsive to fields generated by the first and second radiating elements.

8. The antenna of claim 1, wherein the first and second radiating elements are connected to ground.

9. The antenna of claim 1, wherein the upper conductive element comprises a plurality of spaced-apart conductive sheets disposed in a plane of the upper conductive element.

10. The antenna of claim 1, further comprising extension elements disposed along a perimeter of the lower conductive element and extending toward the first and second radiating elements.

11. The antenna of claim 1, wherein the first and second radiating elements each comprise a slot antenna.

12. The antenna of claim 1, wherein a first terminal end of the third conductive element is conductively coupled to the first radiating element and a second terminal end of the third conductive element is conductively coupled to the second radiating element.

13. The antenna of claim 1, wherein each one of the first and second radiating elements, and the third, upper, and lower conductive elements comprises a conductive sheet disposed in an insulating material to conductively isolate the first and second radiating elements, and the third, upper, and lower conductive elements.

* * * * *